United States Patent
Gargano et al.

(10) Patent No.: US 7,128,212 B2
(45) Date of Patent: Oct. 31, 2006

(54) SEALING SYSTEM FOR PORTS OF VESSELS USED FOR CORROSIVE FLUIDS

(75) Inventors: Anthony Gargano, Savage, MN (US); Keith Gossen, Carver, MN (US); Charles W. Extrand, Minneapolis, MN (US)

(73) Assignee: Entegris, Inc., Chaska, MN (US)

( * ) Notice: Subject to any disclaimer, the term of this patent is extended or adjusted under 35 U.S.C. 154(b) by 330 days.

(21) Appl. No.: 10/466,405

(22) PCT Filed: Jan. 25, 2002

(86) PCT No.: PCT/US02/02067

§ 371 (c)(1),
(2), (4) Date: Dec. 23, 2003

(87) PCT Pub. No.: WO02/059516

PCT Pub. Date: Aug. 1, 2002

(65) Prior Publication Data

US 2004/0089667 A1 May 13, 2004

Related U.S. Application Data

(60) Provisional application No. 60/264,207, filed on Jan. 25, 2001.

(51) Int. Cl.
*B65D 85/84* (2006.01)

(52) U.S. Cl. .................................. 206/524.4; 220/601
(58) Field of Classification Search .. 206/524.1–524.5; 220/89.1, 582, 586, 917, 601, 634; 588/249, 588/261, 900

See application file for complete search history.

(56) References Cited

U.S. PATENT DOCUMENTS

| 3,501,055 | A | | 3/1970 | Jurion et al. |
| 3,724,172 | A | | 4/1973 | Starr et al. |
| 4,560,189 | A | * | 12/1985 | Lang et al. ............... 285/136.1 |
| 4,886,178 | A | | 12/1989 | Graf |
| 4,941,584 | A | * | 7/1990 | Bowers et al. ............... 220/601 |
| 5,119,883 | A | * | 6/1992 | Wagstaff et al. ............ 164/487 |
| 6,045,000 | A | * | 4/2000 | Rauworth et al. ........... 220/601 |
| 6,111,028 | A | | 8/2000 | Brinati et al. |

FOREIGN PATENT DOCUMENTS

| DE | 25 30 755 | | 1/1977 |
| GB | 2 084 386 | * | 4/1982 |
| WO | WO 98/05731 | | 2/1998 |

OTHER PUBLICATIONS

International Search Report.
Admitted Prior Art, 1 page.

(Continued)

*Primary Examiner*—Luan K. Bui
(74) *Attorney, Agent, or Firm*—Patterson, Thuente, Skaar & Christensen, P.A.

(57) ABSTRACT

A sealing system, sealing system components, and methods of manufacture and use for a vessel that holds corrosive liquid, with the sealing system having a port on the vessel, an insert, and a sealing element. The sealing element is corrosion-resistant, essentially impermeable to corrosive and critical fluids, essentially free of leachable impurities and is made with a material having a Shore A hardness between about 70 and about 95. A preferred material for the sealing ring is the class of materials known as polyolefins. The insert is operably engageable with the port and the sealing element to create a seal between the sealing element and the first and second sealing surfaces to prevent fluid flow through the port.

11 Claims, 4 Drawing Sheets

OTHER PUBLICATIONS

Supplementary European Search Report.
*Engage Polyolefin Elastomers*, pp. 1-3, published Aug. 2005 by Dow Chemical Company.
*Material Safety Data Sheet*, p. 1-6, revised on Aug. 24, 2004 by Dow Chemical Company.
*Material Safety Data Sheet*, p. 1-7, revised on Aug. 24, 2004 by Dow Chemical Company.
*Material Safety Data Sheet*, p. 1-7, revised on Jun. 13, 2003 by Dow Chemical Canada Inc.

* cited by examiner

Fig 6A
Fig 6B
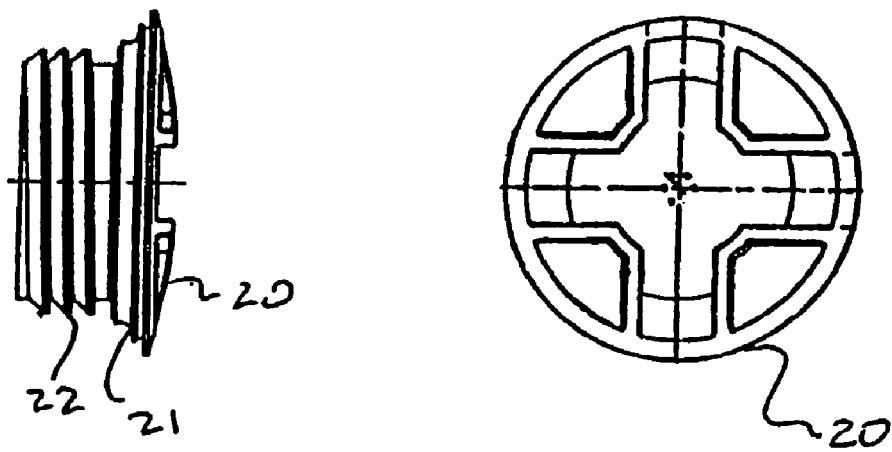
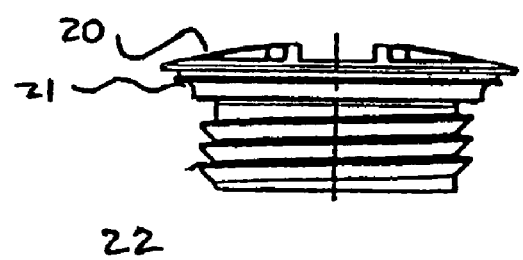
Fig. 6C

SEALING SYSTEM FOR PORTS OF VESSELS USED FOR CORROSIVE FLUIDS

RELATED APPLICATIONS

This application claims priority to U.S. provisional patent 60/264,207 filed Jan. 25, 2001, which is hereby incorporated by reference herein.

FIELD OF THE INVENTION

The invention relates to sealing systems for fluid handling storage and more particularly to forming a static seal between relatively movable parts, and more particularly to the sealing of the ports of vessels that contain highly corrosive chemicals.

BACKGROUND

Vessels that hold corrosive fluids such as strong acids or strong bases must be made of materials that resist corrosion; suitable materials include polyethylenes and polyfluorocarbons. High-density polyethylene is an especially useful material because it is relatively inexpensive compared to specialty plastics such as fluorocarbons and is also resistant to both acids and bases. Further, it is available in preparations that are free of contaminants, such as trace metals, that can react with corrosive chemicals and thereby compromise their purity and also weaken the structural integrity of the vessel. High-density polyethylene is also amenable to conventional plastics processing techniques so that vessels such as drums, etc., may be made.

Fluids are moved in and out of these vessels via ports, which are openings in the vessel. Vessels that are used to store corrosive chemicals must have ports that can be sealed so that the vessels can be sealed as they are moved from one location to another or are used to store the fluids. Thus a port on the vessel typically receives an insert that achieves a seal between the port and the insert. A port should be sealed not only for the proper storage of corrosive fluids but also not leak when it is fitted with a device that allows transfer of fluids in or out of the vessel, for example, a transfer tube that allows the vessel's contents to be moved out of the vessel.

Vessels used for highly corrosive fluids conventionally require encapsulated dual material O-rings to achieve a seal between the vessel's port and an insert. Encapsulated O-rings are conventionally equipped with a core made of a resilient, flexible material and an outer layer made from a different material that provides corrosion resistance. Thus, the resilient core provides resiliency and flexibility while the outer layer resists corrosion.

Flexibility allows for an O-ring to be deformed so that it may be readily handled and provides a larger sealing area. Thus a flexible, donut-shaped O-ring with a circular cross-section can be compressed and deformed so that its round edges become conformed to the shape of the sealing surface(s) that it contacts. Silicone rubber is a conventionally used core material that has suitable flexibility. Flexibility is related to durometer hardness.

A resilient material tends to resist stresses that cause it to deform from its original shape. Thus a resilient O-ring that has been compressed between two sealing surfaces will tend "push back" against those surfaces and maintain a seal. Further, a resilient material will compensate for expansion or contraction of the vessel, insert, and O-ring materials in response to factors such as temperature changes. Thus when the sealing materials contract in response to cold temperatures, a resilient O-ring will expand to maintain the seal. In contrast, a poorly resilient material will tend to permanently deform in response to compressive forces and forms a weaker seal. A poorly resilient material that gradually deforms after it has been compressed into place experiences plastic flow, also know as "creep", and is likely to provide a poor seal as time passes. Silicone rubber is a conventionally used material that has suitable resiliency.

Silicone rubber, however, has poor chemical resistance and is unsuitable for use as a sealing material that contacts strong acids or bases. Further, it is typically manufactured with significant amounts of impurities that may compromise the purity of fluids in the vessels.

For all of these reasons, O-rings for use with corrosive fluids are conventionally made with a resilient material covered with an outer layer of corrosion-resistant material and are referred to as encapsulated dual material O-rings. The outer layer is conventionally a fluorocarbon polymer such as polytetrafluoroethylene (PTFE), fluorinated ethylene propylene (FEP), or perfluoroalkoxy (PFA). Fluoropolymers have outstanding corrosion resistance and are generally suitable for use with strong acids and bases. They are also impermeable so that the corrosive fluids do not flow through the O-ring and the impurities of the core layer are contained. Fluoropolymers are the conventionally used engineering plastics for making O-rings that resist corrosion and the release of impurities upon exposure to solvents.

Encapsulated dual material O-rings for drums having at least a 30 gallon capacity are made by an expensive and time consuming process and currently cost approximately $4.00 each. They are typically used as a single-use device so that they are replaced every time an insert is changed in the vessel's port. Their cost is substantial in light of the retail cost of a typical vessel for corrosive liquids, which is about $25.00 for a 55-gallon drum. The corrosive fluids industry would greatly benefit from the replacement of encapsulated dual material O-rings with an inexpensive alternative.

Despite the need for an alternative, the applicants are unaware of any conventionally available alternatives to encapsulated dual material O-rings for use with corrosive or critical fluids.

SUMMARY OF THE INVENTION

The inventors have realized that a material other than a fluoropolymer is desirable for use in making seals for vessels holding corrosive fluids. Fluoropolymers have low resiliency and limited flexibility and, as a result, make poor seals. Further, fluoropolymers have a different rate of thermal expansion than silicone and vessel materials such as high-density polyethylene. Materials with similar rates of thermal expansion would expand or contract similarly in response to changing temperatures so that the performance of the seal will not be compromised.

The inventors' present invention replaces encapsulated dual material O-rings with a system that does not require use of a fluoropolymer and costs approximately twenty times less for each use. In contrast to conventional systems, the present invention avoids the use of encapsulated dual material O-rings. The invention is especially useful for vessels having a large volume, preferably at least 5 gallons, more preferably at least 15 gallons, and most preferably at least about 30 gallons, e.g., a 30 or 55 gallon drum and vessels holding 500–1200 liters.

An embodiment of the invention is a sealing system for a vessel that holds critical or corrosive liquid, with the sealing system having a port on the vessel, an insert, and a sealing element. The sealing element is corrosion-resistant, essentially impermeable to corrosive and critical fluids, comprises a material having a Shore A hardness between about 70 and about 95, and has an exterior that seals against a first sealing surface and against a second sealing surface on the insert. The insert is operably engageable with the port and the sealing element to create a seal between the sealing element and the first and second sealing surfaces to prevent fluid flow through the port.

A preferred embodiment of the invention includes a sealing element made of a single material having a Shore A hardness between about 70 and about 95, and more preferably the sealing material is essentially only one material. The sealing element is preferably a single continuous piece of material. A preferred material is the class of materials known as polyolefin; a more preferred material is a polyolefin commonly referred to by its trade name, ENGAGE™. The polyolefin may be solid or be configured as a foam or according to other dispositions known to those skilled in these arts. A preferred embodiment is a sealing element with less than 5000 ppm trace metals.

Another embodiment of the invention includes a sealing element that has a core and a surrounding layer. The exterior of the layer forms the seal with the insert and port. The core is preferably solid but other variations maybe used, e.g., it may be hollow or made with a foam.

Another embodiment of the invention is a sealing element that effectively seals a vessel but is covered with another material, e.g., another layer of plastic or a coating that provides lubricity, adhesiveness, extra corrosion protection, or other alternatives that will be obvious to those skilled in these arts after reading this disclosure.

An embodiment of the invention includes a sealing system wherein the port threadedly engages the insert such that the insert may be tightened to achieve a seal between the sealing element and sealing surfaces on a port and an insert.

An embodiment of the invention is the method of sealing a vessel. One such method involves providing a sealing element that is corrosion-resistant, essentially impermeable to corrosive fluids, includes a material having a Shore A hardness between about 70 and 95, more preferably between about 75 and about 90 and yet more preferable about 90; placing the insert in the port with the sealing element and mechanically engaging the insert with the port such that the sealing element seals against a first sealing surface on the port and also seals against a second sealing surface on the insert to prevent fluid flow through the port.

BRIEF DESCRIPTION OF THE DRAWINGS

FIG. 6A is a top plan view of an insert suitable for use in the sealing system.

FIG. 6B is a left elevated view of an insert suitable for use in the sealing system.

FIG. 6C is a front elevated view of an insert suitable for use in the sealing system.

DETAILED DESCRIPTION OF THE PREFERRED EMBODIMENTS

Figure 1:
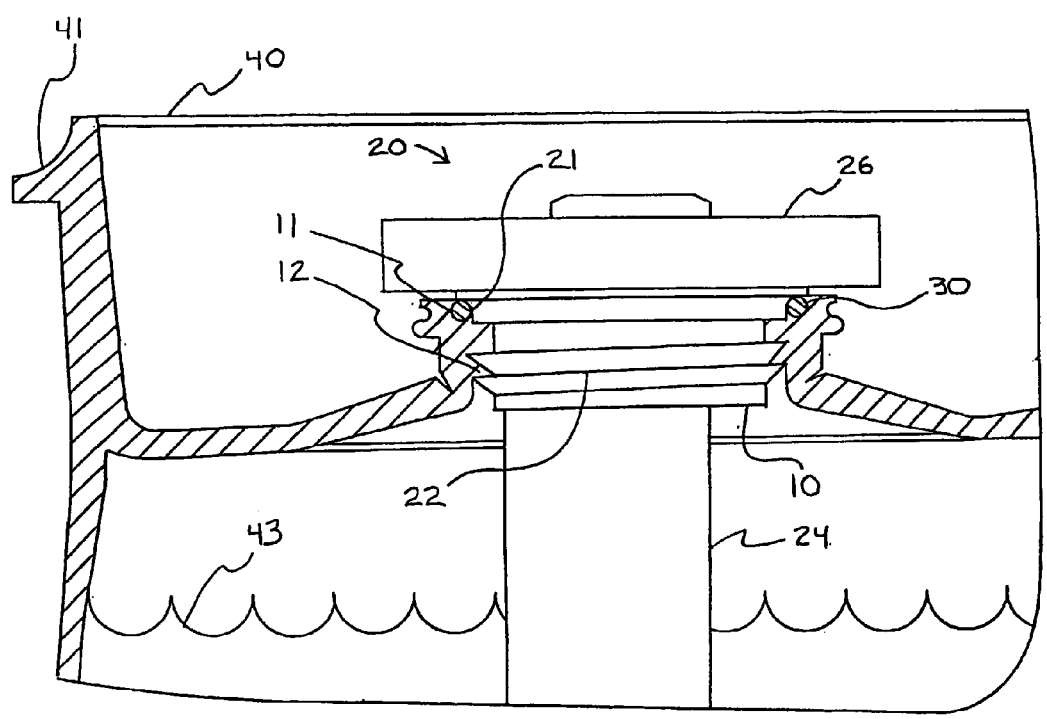
FIG. 1 is a sectional view of the sealing system deployed in a drum.
Figure 2A:
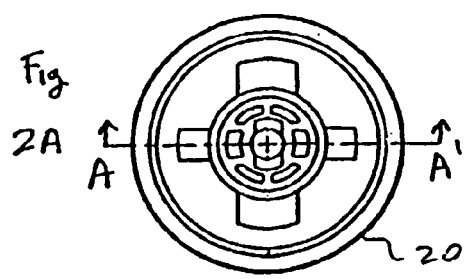
FIG. 2A is a top plan view of an insert suitable for use in the sealing system.
Figure 3A:
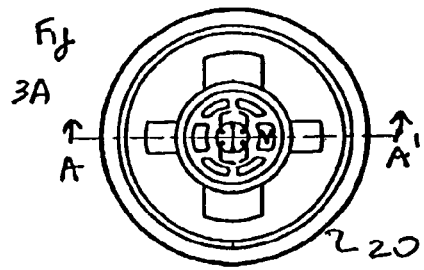
FIG. 3A is a top plan view of an insert suitable for use in the sealing system.
Figure 2B:
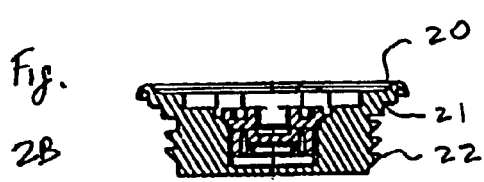
FIG. 2B is a cross-sectional view of an insert suitable for use in the sealing system taken along section A–A' of FIG. 2A.
Figure 3B:
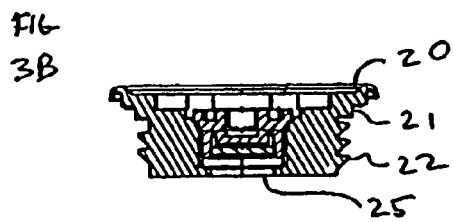
FIG. 3B is a cross-sectional view of an insert suitable for use in the sealing system taken along section A–A' of FIG. 3A.
Figure 4A:
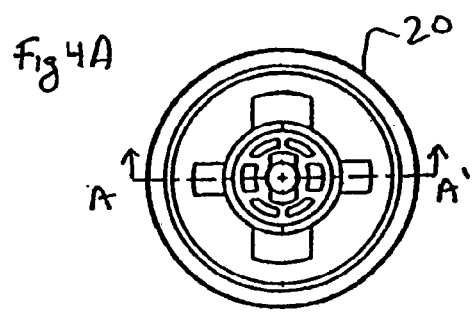
FIG. 4A is a top plan view of an insert suitable for use in the sealing system.
Figure 5A:
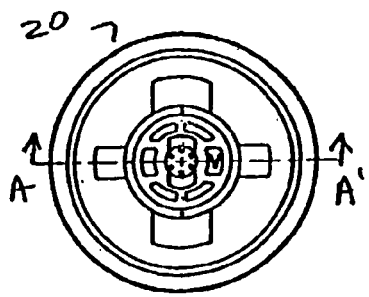
FIG. 5A is a top plan view of an insert suitable for use in the sealing system.
Figure 4B:
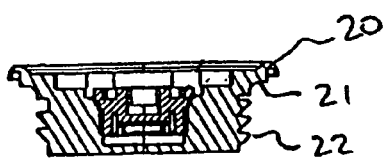
FIG. 4B is a cross-sectional view of an insert suitable for use in the sealing system taken along section A–A' of FIG. 4A.
Figure 5B:
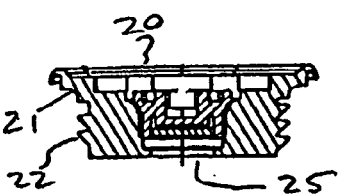
FIG. 5B is a cross-sectional view of an insert suitable for use in the sealing system taken along section A–A' of FIG. 5A.

Referring generally to FIGS. 1–7, a vessel 40 is equipped with sealing system 41 including port 10, insert 20, and sealing ring 30. Port 10 has threads 12 and sealing surface 11. Insert 20 has insert sealing surface 21, insert threads 22, and insert stem 24. Sealing ring 30 is donut-shaped and made of a resilient polyolefin elastomer. Port 10 is placed on vessel 40 so that fluids may be moved in and out of the port. Port threads 12 threadedly engage insert threads 22 and compress sealing ring 30 against sealing surface 11 and insert sealing surface 21. Insert 20 is optionally equipped with inert stems 24 that allow communication between the critical fluid 43 contained in the vessel 40 and insert top cap assembly 26. Insert 20 is optionally equipped with openings 25 that allow communication of vessel 40 with the interior of insert 20. Insert sealing surface is adaptable to a variety of shapes including rounded (FIGS. 4–5) or squared (FIGS. 2–3). Other shapes may be used as appropriate, e.g., triangular, polygonal, dimpled, and the like. Insert 20 may also be configured as a solid bull plug (FIG. 6).

Figure 7:
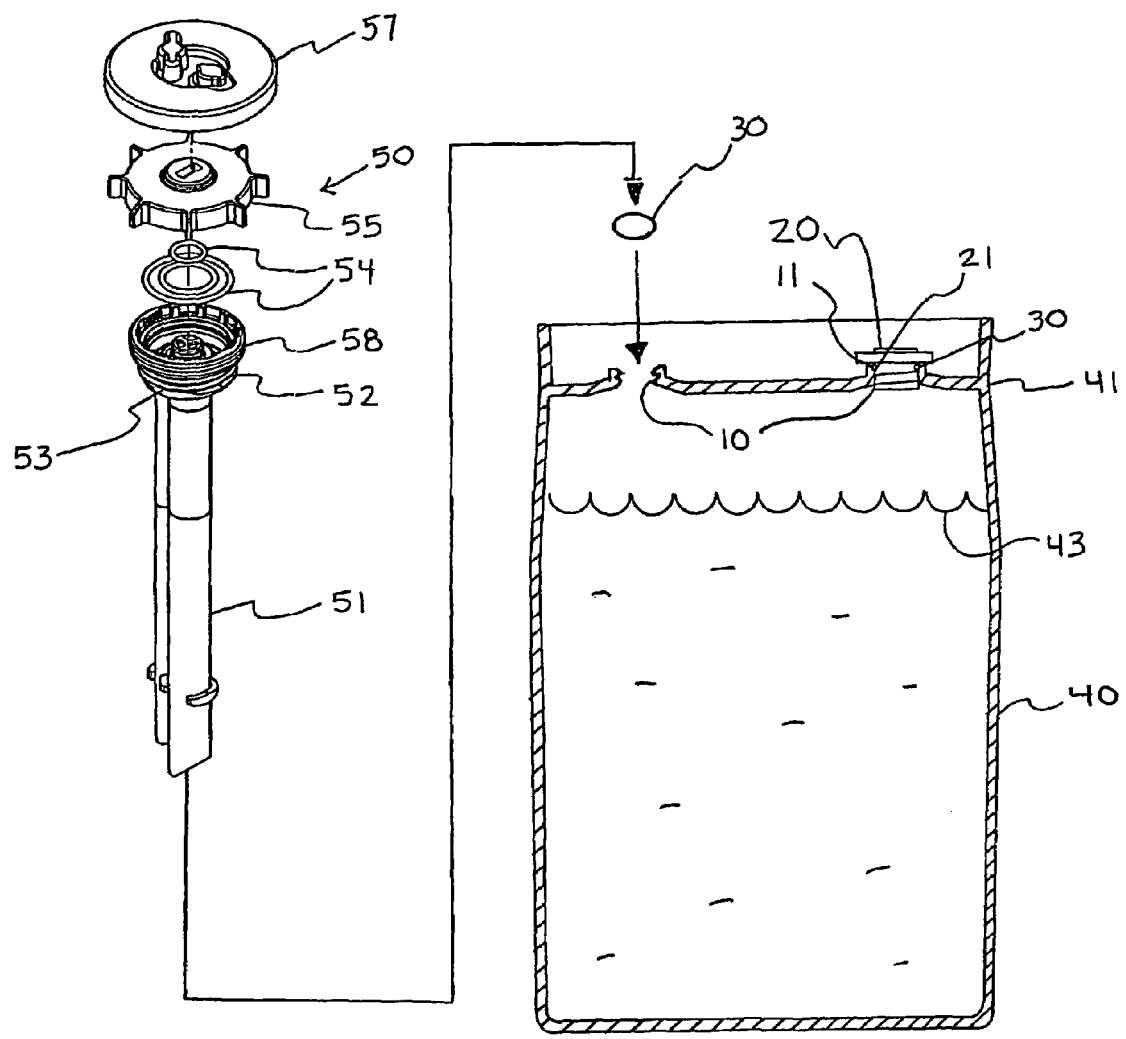
FIG. 7 is a perspective view of the sealing system disposed in a drum and an exploded view of an insert suitable for use with the sealing system.

Sealing system 41 may be installed in a drum-type vessel (FIG. 7). One preferred embodiment of the insert is shown in FIG. 7. Insert 50 includes stems 51, insert threads 52, insert sealing surface 53, cap assembly 55, top cap assembly 57, outer threads 58, and rings 54. Rings 54 are disposed in the cavity defined by outer threads 58 and cap assembly 55 threadedly fits into outer threads 58. Cap assembly 55 threadedly receives top cap assembly 55. Stems 51 are hollow tubes that allow communication between the vessel and the cap assembly and/or top cap assembly. Insert threads 52 are available to engage threads in the port on the vessel.

The vessels contemplated in the invention are preferably for use in storing a liquid. The liquid may be stored for later use or stored with a device that allows fluid to be moved in or out of the vessel. Thus a seal of the invention may be used, for example, between a bull plug and a port in the vessel or between a dispensing head and the port. One embodiment of the invention is storing the fluid for transportation by rail, truck, or other vehicle. Liquids, however, have a vapor phase that is present in any portion of a closed vessel not filled with liquid; accordingly, this vapor phase must be contained if the vessel is to be prevented from releasing the fluid. The preferred material for use in the vessels is polyethylene, especially high density polyethylene (HDPE). HDPE vessels, such as drums, are typically made primarily of a single continuous piece of HDPE.

The port is preferably part of a vessel and is preferably made of the same material as the vessel, preferably high-density polyethylene. Other materials for the vessel and the port are also suitable, for example, materials containing fluorocarbon, polycarbonate, polypropylene, polyvinylchloride, polyolefin, and other materials known to those skilled in these arts. The port is preferably threaded so as to better engage the insert. The threads may be disposed on the inside or the outside of the port as required to engage the insert.

Port is a term used broadly herein to mean an opening into the vessel. The port Means not only the opening but the materials that surround and define the opening and that are associated with the operation of the port with the insert and/or sealing ring. Thus a port may be integrally molded with the vessel, be a separate part, comprise multiple parts, or a combination thereof. The port would include parts that cooperate with the sealing ring and insert to create a seal. The port has a sealing surface that is adapted to seal against the sealing ring. The sealing surface may be integrally molded into the main portion of the port or be a separate part that is a portion of the port.

The insert is made from an engineering plastic, preferably high-density polyethylene. Other materials for the insert are also suitable, for example, materials containing fluorocarbon, polycarbonate, polypropylene, polyvinylchloride, polyolefin, and other materials known to those skilled in these arts. The insert is preferably threaded so as to better engage the port. The threads may be disposed on the inside or the outside of the insert as required to engage the insert. The insert may fit within the port, have a portion that fits inside the port, or fit on top of the port. The insert has a sealing face that seals with the sealing member. The sealing face may be integral to the insert or be a part that is used in conjunction with the insert, e.g., a washer, an member that cooperates with the rest of the insert, or be other sealing surfaces known to those skilled in these arts. Insert is a term used broadly herein to encompass devices and portions of devices that cooperate with a port and a sealing ring to form a seal. An insert may be a single unitary part or have several parts.

The sealing ring is preferably made from one material that is flexible, resilient, has only low amounts of trace metals and/or leachable metals, and resists chemical attack by critical fluids and corrosive fluids, e.g., strong acids and strong bases. A suitable material is a polyolefin elastomer, for example ENGAGE™, a polyolefin elastomer manufactured by DUPONT-DOW™ and described by patents U.S. Pat. No. 5,721,185 and E.P. 0416815, both of which are hereby incorporated by reference. The polyolefin elastomer preferably has a Shore A durometer of about 70–95, more preferably about 75–90, and yet more preferably about 90 as determined by the ASTM shore A hardness test.

The sealing ring is preferably made with a single material such that the material has a consistent chemical composition throughout its volume. The material may be made uniformly of several components, e.g., a blend of more than one polymer. An embodiment of the sealing ring is a ring that is hollow. An alternative embodiment includes enhancing the resiliency and physical properties of the sealing ring by using a foamed material, for example ENGAGE™ processed with foam techniques, see, for example U.S. Pat. No. 5,369,136, which is hereby incorporated by reference herein.

The sealing ring may optionally also have an outer skin that is sprayed or otherwise thinly applied over a core in a layer of less than about 10 mm thickness, preferably less than 1 mm. This outer skin is different from encapsulated dual material O-rings because the skin is thinner and is made of the same material as the core of the sealing ring.

Sealing ring is a term that is used broadly herein to mean a device with a solid portion that forms a seal against solid surfaces to prevent fluid flow. A test for a sealing ring is to assemble the sealing ring with a port and insert and determine if it will hold 3 psi of air for 5 minutes without leaking. The sealing ring is not limited to any particular geometric shape but may be, for example, donut-shaped, gasket-shaped, round, toroidal, curved at all points, have edges, flat faces, have polygonal profile in a cross-sectional view, square in a profile, and other shapes that are suitable for operation of the sealing ring.

The sealing ring is preferably made of a material that has a total trace metal level as measured in a nitric acid digestion test of less than 5000 parts per million (ppm), more preferably less than 1000 ppm, and most preferably less than 500 ppm. Examples are described herein under "testing". The DUPONT DOW™ polyolefin elastoiner ENGAGE™ is a suitable material for the sealing ring, for example ENGAGE™ 8401. The term polyolefin elastomer, as used herein, includes copolymers of polyolefins, and includes elastomeric copolymers of ethylene and octene. ENGAGE™ polyolefins are copolymers of ethylene and octene-1.

The sealing ring is preferably donut-shaped with a longitudinal cross-section that has the shape of a zero with an empty middle and a transverse cross-sectional profile that has a solid circular shape before use. Alternatively the sealing ring may be shaped with a transverse cross-section as any kind of polygon or ellipse or circle or a combination polygon and/or ellipse and/or circle. Alternatively the sealing ring may also have a longitudinal cross section that shaped as any kind of polygon or ellipse or circle or a combination polygon and/or ellipse and/or circle.

The sealing system is installed on a vessel by creating a port in a vessel such as a drum by creating an opening in the drum and equipping it with threads or other fasteners or gripping means for engaging an insert. The port has a port-sealing surface to seal with the sealing ring. The sealing ring is placed in the port or on the insert, or incorporated into the port or insert as a permanent part. The insert is placed in the port so that the threads or fasteners or gripping means on the insert or port are engaged. The insert is placed so that the sealing ring provides a seal between the sealing ring and the port sealing surface and the insert sealing surface.

In a preferred embodiment, the sealing system includes a donut-shaped sealing ring that has an exterior surface having an inner portion that is defined in part by the inner diameter of the donut and an outer diameter that is defined in part by the outer diameter of the donut. In use, the inner portion of the donut seals against he insert and the outer portion seals against the port.

The invention includes methods for manufacturing the port, inserts, and sealing rings, including molding, blow-molding, extrusion, and other techniques known to those skilled in these arts.

The invention includes methods for sealing vessels used to hold critical fluids in semiconductor fabrication facilities. Such facilities use large amounts of strong acids and bases that must be safely and reliably stored and dispensed without contamination. Critical fluids are sulfuric acid, hydrochloric acid, hydrofluoric acid, tetramethyl ammonium hydroxide (TMAH), ammonium hydroxide, hydrogen peroxide, phosphoric acid, n-methyl pyridine (nMP), and isopropyl alcohol (IPA). As used herein, "critical" fluids are not defined in relation to the concept of "critical point" and are included in the term "corrosive". Fluids, as used herein, means liquid and/or gas and/or vapor phase.

Another aspect of the invention is the use of the sealing system for storage and transfer of critical fluid applications within semiconductor fabrication facilities and other facilities that have critical fluids that include sulfuric acid, hydrochloric acid, hydrofluoric acid, tetramethyl ammonium hydroxide (TMAH), ammonium hydroxide, hydrogen peroxide, phosphoric acid, n-methyl pyridine (nMP), and/or isopropyl alcohol (IPA). The sealing system is preferably provided in corrosion-resistant drums that contain critical fluids.

Another aspect of the invention is a sealing ring covered with another layer of material. The sealing ring continues to have the functions already described, e.g., the ability to hold pressure, but is covered with a separate material. The separate material can be a plastic that enhances the corrosion, shelf life, wear resistance, or other use or performance aspects of the sealing ring. This invention is distinct from prior art dual material encapsulated O-rings because the prior art O-rings required two materials to perform the specified function. In contrast, this embodiment of the invention provides for a functional sealing ring made of a single material plus a second material that enhances its function.

TESTING AND EXAMPLES

Resins were examined to determine their cleanliness levels with regards to trace metals (Table I). Samples of the same weight were completely dissolved and the total metal content in each resin was measured (per ENTEGRIS™ procedure FGTM 1343). Four materials, the DOW™ low-density polyethylene (LDPE), EQUISTAR™ LDPE), ENGAGE™ polyolefin, and ethyl vinyl acetate (EVA) were selected for further testing on the basis of these results.

TABLE I

Trace Metal Results- Digestion

| Material | Material Grade | Total Trace Metal Level (ppm) |
|---|---|---|
| DOW ™ low density polyethylene | 779 I | 309 |
| NOVA ™ low density polyethylene | NOVAPOL ™ GI-20240-A | 514 |
| EQUISTAR ™ low density polyethylene | PETROTHENE ™ NA 204-000 | 281 |
| DOW ™ ENGAGE ™ polyolefin elastomer | ENGAGE ™ 8402 | 453 |
| SANTOPRENE ™ polyolefin elastomer | 121-75-M100 | 5615 |
| Ethyl Vinyl Acetate | ELVAX ™ 650 | 426 |
| VITON ™ hexafluoropropylene copolymer | A-241 | 12,646 |

These four materials were molded into standard sized O-rings usable for high density polyethylene plastic drums and tested for total metal content with commercially available standard sized O-rings of the same size and dimensions: 3.0 inch outermost diameter, 2⅝ inch inner diameter, radial thickness of 3/16 inch; see also for example part number REAL SEALT™-334 made by REAL SEAL™ (Table 2). These O-rings were tested for trace metal content by measuring the amount of metals leached from the O-rings in the space of 7 days in 5% ultrapure nitric acid, see Table 2. The results showed that these four materials were compared favorably to encapsulated dual material O-rings.

TABLE II

Trace metal results - extraction test

| Material | Part Number/ Material Grade* | Total Trace Metal (ppb) |
|---|---|---|
| ENTEGRIS ™ EPDM | ENTEGRIS ™ part number 1620-334 | 61.5 |
| ENTEGRIS ™ VITON | ENTEGRIS ™ part number 1621-334 | 80.0 |
| ENTEGRIS ™ fluoropolymer encapsulated dual material O-rings | ENTEGRIS ™ part number 1621-334 | 2.7 |
| DOW ™ low density polyethylene | Material grade 779 I | 3.3 |
| EQUISTAR ™ low density polyethylene | PETROTHENE ™ NA-204-000 | 2.5 |
| DOW ™ ENGAGE(tm) Polyolefin | Material grade 8200 | 2.5 |
| Ethyl Vinyl Acetate | Material grade 650Q | 4.5 |

*ENTEGRIS ™ catalogs are available to the public; catalog as of January 2001.

Further testing was necessary to determine if these four materials were suitable for use in a sealing system that would replace encapsulated dual material O-rings. Table III shows the results of hydrostatic tests used to determine if these materials could form viable seals that did not leak. In the hydrostatic test, the O-Rings were mounted on threaded ports identical to those used on the ENTEGRIS™ high-density polyethylene drum part number 01-004404 and sealed with threaded plugs. ENTEGRIS™ part number 151-131R. The seals were tested with water to a pressure of 25 psi.

TABLE III

Hydrostatic Testing Results

| Material | Part Number/ Material Grade | Test Results |
|---|---|---|
| DOW ™ low density polyethylene | Material grade 779 I | 1/6 leaked |
| EQUISTAR ™ low density polyethylene | PETROTHENE ™ NA-204-000 | 0/6 leaked |
| DOW ™ ENGAGE ™ Polyolefin | material grade 8402 | 0/6 leaked |
| Ethyl Vinyl Acetate | ELVAX 650Q | 1/6 leaked |

The results summarized in Table III showed that the ENGAGE™ material was the material with the best physical properties, including resiliency and flexibility that passed the hydrostatic tests. The EQUISTAR™ low-density polyethylene is an alternative to encapsulated dual material O-rings but has physical properties inferior to the ENGAGE™ material.

Further hydrostatic testing was performed with a range of ENGAGE™ polyolefins, as summarized in Table IV; these tests are the same as set forth in Table III unless otherwise described. The ENGAGE™ grade 1 material performed the best from a hydrostatic test standpoint but it was difficult to use from a handling/assembly standpoint. Difficulties included tendency to adhere to the plastic insert so that talcum powder was required to slide the O-ring over the insert, lengthy time required to work the O-ring over the insert because of its limited flexibility. The ENGAGE™ grade 2 material had the best handling properties but was ineffective in the hydrostatic test.

TABLE IV

Hydrostatic Test Results

| Material | Material Grade | Test Result failures/attempts |
|---|---|---|
| ENGAGE ™ Grade 1 | 8402 | 0/6 |
| ENGAGE ™ Grade 2* | 8401 | 7/12 |
| ENGAGE ™ Grade 3 | 8407 | 2/12 |

*This material was re-tested in a larger sized O-ring that did not fail in 12 attempts.

The inventors solved these problems by changing the size of the O-ring and using the ENGAGET™ 8401 grade 2 material. Instead of using a standard size O-ring, they made an O-ring shaped sealing ring with a smaller inner diameter. For the ease of commercial use, they adapted the same size and shape of commercially available encapsulated dual material O-rings. These sealing rings were found to function effectively and did not leak in 2 tests of six samples each. The sealing rings had dimensions of inner diameter 2.545±0.020 inches, cross-sectional diameter 0.235±0.010 inches.

The corrosion resistance of the sealing system of the invention was tested by exposing the sealing system to various chemicals (Table V). The sealing rings were made from ENGAGE™ grade 2 material and installed on an ENTEGRIS™ threaded insert (bull plug part number 151-131R) that was fitted into a ENTEGRIS™ high density polyethylene drum with integrally molded, threaded ports (see FIGS. 1, 6, and 7). The sealing systems were cut from the drums and placed into a sealed container with the various chemicals listed in Table V. The sealing system was exposed to direct chemical and to vapor from the chemical. The containers were monitored for three months. The durometer and weight of the sealing rings was measured after the three months and compared to controls that had not been exposed to the chemicals. Essentially no change in the diameter or weight of the sealing rings were detected, except for sealing rings exposed to nitric acid (see Table V). The failure of the sealing rings in nitric acid is, however, not a bar to the use of the sealing rings in the critical fluids contemplated by the inventors. The other data indicated in Table V is taken from published sources and does not reflect testing de novo.

TABLE V

Chemical Compatibility

| Chemical | EPDM | VITON ™ | TEFLON ™ encapsulated dual material O-rings | Sealing Rings |
|---|---|---|---|---|
| Sulfuric Acid | no | yes | yes | yes |
| Nitric Acid | no | yes | yes | no |
| Hydrochloric Acid | no | yes | yes | yes |
| Hydrofluoric Acid | no | yes | yes | yes |
| Tetramethyl ammonium hydroxide (TMAH) | yes | no | yes | yes |
| Ammonium hydroxide | yes | no | yes | yes |
| Hydrogen Peroxide | yes | yes | yes | yes |
| Phosphoric Acid | yes | yes | yes | yes |
| n-methyl pyridine (nMP) | yes | no | yes | yes |
| isopropyl alcohol (IPA) | yes | yes | yes | yes |

The embodiments and examples of the invention disclosed herein are examples of the invention and are not intended to limit the scope of the invention; those skilled in these arts will know many alternative embodiments of the invention after they have read this application.

It is claimed:

1. A system for holding critical fluids, the system comprising:
a vessel that is made with polyethylene, has at least about 30 gallons of capacity, and a fluid contained therein, the fluid being a member of the group consisting of sulfuric acid, hydrochloric acid, hydrofluoric acid, tetramethyl ammonium hydroxide, ammonium hydroxide, hydrogen peroxide, phosphoric acid, n-methyl pyridine, isopropyl alcohol, mixtures thereof, and mixtures thereof with other fluids;
a port on the vessel;
an insert mechanically engageable with the port; and
a resilient non-fluoropolymer sealing element comprising a copolymer of ethylene and octene that is corrosion-resistant, essentially impermeable to the contents of the vessel, comprises a material having a Shore A hardness between about 75 and about 95, has less than 1000 ppm total trace metals as measured by digestion in nitric acid and has an exterior that seals against a first sealing surface on the port and against a second sealing surface on the insert;
wherein the port, the insert, and the sealing element cooperate to form a seal between the sealing element and the first and second sealing surfaces that is adapted to hold at least 3 psi of air for at least 5 minutes.

2. The system of claim 1 wherein the sealing element material consists essentially of a single material having a Shore A hardness between about 75 and about 95.

3. The system of claim 2 wherein the sealing element consists essentially of a single continuous piece of the sealing element material.

4. The system of claim 2 wherein the sealing element comprises a core that is disposed under a layer that has a surface that is the exterior and both the layer and the core are made of the sealing element material.

5. The system of claim 2 wherein the sealing element material is a polyolefin.

6. The system of claim 2 wherein the sealing element material is a foam.

7. The system of claim 2 wherein the sealing element is hollow.

8. The system of claim 2 wherein the vessel and the port are made from polyethylene and the port threadedly engages the insert such that the insert may be tightened to achieve the seal between the sealing element and the first and second sealing surfaces.

9. A method for holding critical fluids, the method comprising:
providing a port on a vessel that is made with polyethylene, has at least about 30 gallons of capacity, and holds a critical fluid that includes a member of the group consisting of sulfuric acid, hydrochloric acid, hydrofluoric acid, tetramethyl ammonium hydroxide, ammonium hydroxide, hydrogen peroxide, phosphoric acid, n-methyl pyridine, isopropyl alcohol, mixtures thereof, and mixtures thereof with other fluids;
providing a resilient non-fluoropolymer sealing element comprising a copolymer of ethylene and octene that is corrosion-resistant, essentially impermeable to the contents of the vessel, comprises a material having a Shore A hardness between about 75 and about 95, has less than 1000 ppm total trace metals as measured by digestion in nitric acid and has an exterior that seals against a first sealing surfammonium port and against a second sealing surface on the insert; and mechanically engaging the port and the sealing element with an insert to compress the sealing element to create a seal between the sealing element and the first and second sealing surfaces that is adapted to hold at least 3 psi of air for at least 5 minutes.

10. The method of claim 9 wherein the sealing element material consists essentially of a single material having a Shore A hardness between about 75 and about 90.

11. A system for holding critical fluids, the system comprising:

polyethylene holding means for holding at least 30 gallons of fluid; a fluid in the holding means, the fluid being a member of the group consisting of sulfuric acid, hydrochloric acid, hydrofluoric acid, tetramethyl ammonium hydroxide, ammonium hydroxide, hydrogen peroxide, phosphoric acid, n-methyl pyridine, isopropyl alcohol, mixtures thereof, and mixtures thereof with other fluids;

a means for fluid egress or ingress of the vessel;

an insert means engageable with fluid egress or ingress means; and a non-fluoropolmer means for sealing that cooperates with the insert means and means for fluid egress or ingress of the vessel, the sealing means comprising a copolymer of ethylene and octene and being corrosion-resistant, essentially impermeable to the contents of the vessel, having a Shore A hardness between about 75 and about 95, having less than 1000 ppm total trace metals as measured by digestion in nitric acid, and being adapted to hold at least 3 psi of air for at least 5 minutes.

\* \* \* \* \*

UNITED STATES PATENT AND TRADEMARK OFFICE
CERTIFICATE OF CORRECTION

PATENT NO. : 7,128,212 B2
APPLICATION NO. : 10/466405
DATED : October 31, 2006
INVENTOR(S) : Anthony Gargano, Keith Gossen and Charles W. Extrand It is certified that error appears in the above-identified patent and that said Letters Patent is hereby corrected as shown below:

Column 5, Line 7, replace "Means" with --means--
Column 6, Line 13, replace the word "elastoiner" with --elastomer--
Column 7, Line 61, "SEALT" should be replaced with --SEAL--
Column 9, Line 14, replace "ENGAGET" with --ENGAGE--
Column 11, Line 3, replace the word "surfammonium" with --surface--

Signed and Sealed this

Twelfth Day of August, 2008

JON W. DUDAS
*Director of the United States Patent and Trademark Office*